Nov. 25, 1941.   E. P. FELCH, JR   2,264,132
METHOD AND APPARATUS FOR MEASURING CROSS TALK
Filed June 20, 1939   2 Sheets-Sheet 1

INVENTOR
E. P. FELCH, JR.
BY
H. A. Burgess
ATTORNEY

Nov. 25, 1941.   E. P. FELCH, JR   2,264,132
METHOD AND APPARATUS FOR MEASURING CROSS TALK
Filed June 20, 1939   2 Sheets-Sheet 2
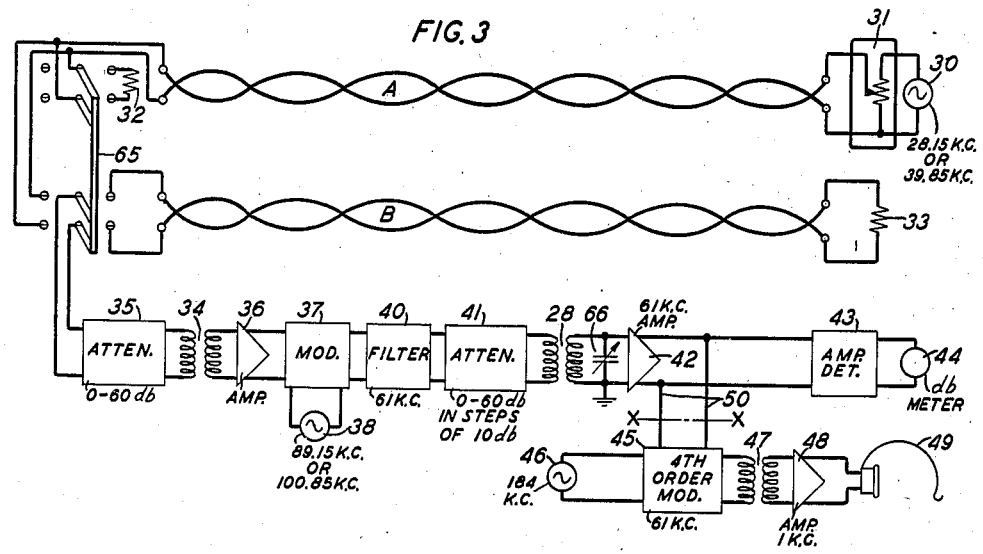
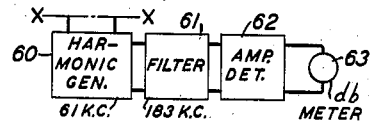
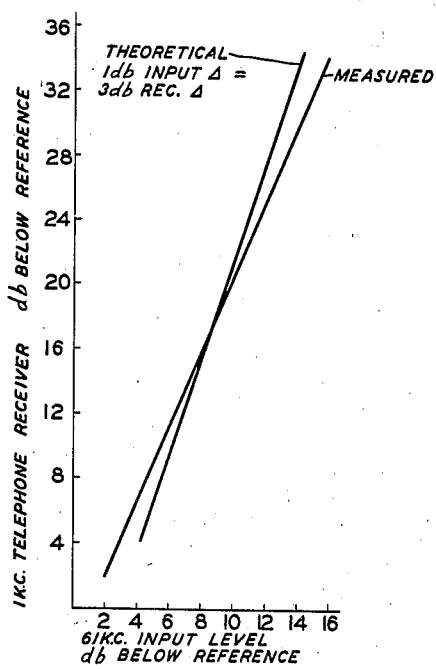
INVENTOR
E. P. FELCH, JR.
BY
ATTORNEY Patented Nov. 25, 1941

2,264,132

UNITED STATES PATENT OFFICE 2,264,132

METHOD AND APPARATUS FOR MEASURING CROSS TALK

Edwin P. Felch, Jr., Chatham, N. J., assignor to Bell Telephone Laboratories, Incorporated, New York, N. Y., a corporation of New York Application June 20, 1939, Serial No. 280,019

20 Claims. (Cl. 179—175.3)

This invention relates to electrical measurements in intelligence transmission systems, and more particularly to a method of and apparatus for expeditiously measuring cross-talk between conductor pairs in a cable used in carrier current systems.

The closely packed relation of twisted pairs in a cable brings carrier current circuits into such close proximity to each other that, notwithstanding the fact that the twisting or transposing of the conductors balances out for the most part the inductance and capacity effects of one circuit with relation to another, there usually remain slight dissymmetries which produce some degree of cross-talk between carrier circuits. The tendency for cross-talk to occur increases with frequency, and, as the carrier frequencies employed in cable carrier systems may extend to 60 kilocycles or higher, it is a practice to minimize cross-talk by connecting adjustable reactance units between the pairs so as to compensate for and balance between carrier circuits the unbalanced mutual inductance and capacity that arise from such carrier circuit dissymmetries.

Heretofore, such compensation and balancing have been accomplished on the basis of a test wherein a signal is applied to one end of one of the pairs under test and the cross-talk is heterodyned at the opposite end of the other pair under test to provide an audible heterodyned component, each pair being terminated with its characteristic impedance. The balancing reactance unit connected between the two pairs under test is then adjusted until the cross-talk transferred from the pair carrying the signal to the adjacent pair is substantially balanced to a minimum as determined by the magnitude of the audible heterodyned component. The present invention is concerned with the discovery that the heterodyned component may be translated into another form of energy and the translated form of energy utilized for effecting a balancing of cross-talk.

It is an object of the invention to determine the transmission characteristics of electrical apparatus.

It is another object of the invention to provide a method of and apparatus for expeditiously measuring and balancing for cross-talk in cable carrier systems.

It is a further object of the invention to provide a method of and apparatus for measuring the transmission efficiency of electrical apparatus.

In one form of apparatus employed heretofore for balancing cross-talk, a high frequency oscillator is applied to one end of a disturbing pair while to the opposite end of a disturbed pair is connected a heterodyne amplifier-detector whose output embodies a telephone receiver for observing an audible heterodyned component corresponding to the cross-talk in the disturbed pair. A balancing unit is continuously adjusted until the observed cross-talk attains a substantially minimum value.

In a preferred embodiment of the invention an adjustable attenuator is embodied in the heterodyned output and initially adjusted to provide a predetermined maximum attenuation thereof. Thereafter, the attenuator is adjusted in equal steps toward zero in such manner that one adjustment of the balancing unit and one visual cross-talk observation are effected for each degree of attenuation. The cross-talk measurement for each degree of attenuation is represented by the product of the attenuator setting and the visual observation, the minimum product serving to indicate the optimum adjustment of the balancing unit. A unique aural arrangement comprising means for translating the heterodyned output into another form of energy and for utilizing the translated form of energy aids materially in reducing the time required to obtain optimum adjustment of the balancing unit.

The invention will be readily understood from the following description taken together with the accompanying drawings in which:

Fig. 3 is a schematic circuit illustrating a preferred embodiment of the invention;

Fig. 4 is an alternate arrangement of a portion of Fig. 3;

Fig. 6 is a curve illustrating action of Fig. 3.

Referring to Fig. 3, conductor pairs A and B represent two pairs of a multiconductor carrier cable to be balanced for cross-talk effects therebetween. For the purpose of this description it may be assumed that the section of carrier cable to be measured and balanced is seventeen miles long, and this is one of a plurality of such sections extending between a series of telephone repeater stations, which sections, when joined together through their associated repeaters, constitute a complete cable transmission line. Each pair of conductors in the carrier cable may accommodate a plurality of carrier channels, depending on the frequency band utilized for each channel and the frequency separation therebetween.

The cable is measured for cross-talk and balanced therefor section by section; and at some point along each section, preferably at one end, is provided a necessary adjustment panel or plurality of adjusting panels upon which the balancing reactance units are mounted. The sectional adjusting panels are preferably of two types, intragroup and intergroup, so as to accommodate balancing units for interconnecting each pair with every other pair in the section. The intragroup is designed to accommodate ten quads and comprises twenty coils for side-to-side balancing and one hundred eighty coils for pair-to-pair balancing. The intergroup panel is designed to accommodate the balancing of one group of ten quads to another group of ten quads thereby embodying four hundred coils. The general arrangement of cross-talk adjusting panels and balancing reactance units, and the relation of the balancing units to the carrier conductor pairs may be generally of a type disclosed in the patent of A. G. Chapman, No. 1,863,651, issued June 21, 1932, or the patent of O. H. Coolidge et al. No. 2,008,061, issued July 16, 1935.

Figure 1:
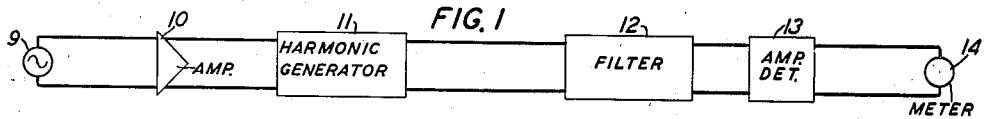
Fig. 1 is a box representation of one embodiment of the invention.
Figure 2:
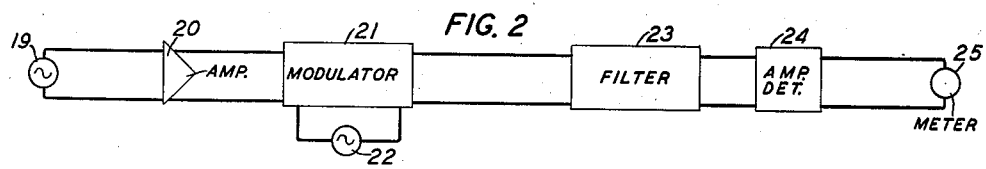
Fig. 2 is a box representation of another embodiment of the invention.

To enable an expeditious accomplishment of the measurement and the balancing of carrier frequency cross-talk between the pairs A and B shown in Fig. 3 which will be subsequently explained, there is utilized a measuring device which is shown in Fig. 1 and which may be modified as shown in Fig. 2, both of which figures will now be described.

Referring to Fig. 1, a signaling source 9 whose alternating voltage is to be measured impresses such voltage on an amplifier 10 whose output is applied to a thermionic harmonic generator 11 wherein a predetermined harmonic of the signal voltage is produced. This predetermined harmonic is applied through filter 12 to an amplifier-detector 13 and the magnitude thereof indicated on a suitable meter 14 connected in the output thereof. Obviously, the amplifier-detector 13 may be provided with any desired output which, for the purpose of this illustration, is preferably assumed to be logarithmic. Therefore, it is required that the meter 14 be calibrated in decibels. Such amplifier-detector output and meter calibration will be referred to with more detail hereinafter.

It is well known in the production of harmonics in a thermionic device that a certain relation exists between a fundamental or signaling voltage and harmonics thereof. That is, a second harmonic voltage is proportional to the fundamental input voltage squared and a third harmonic voltage is proportional to the fundamental input voltage cubed. In other words, a 1-decibel change in the level of the fundamental input power will cause a 2-decibel change in the level of the second harmonic power and a 3-decibel change in the level of the third harmonic power.

Consequently, in the case of higher order harmonics, a 1-decibel change in the level of a fundamental or signaling power will cause $n$-decibels change in the level of the harmonic power, where $n$ is a number expressing the frequency multiple of the predetermined harmonic. This relatively large differential change between the levels of the signal and harmonic power may be utilized to advantage in measuring apparatus, particularly in the null or comparison type in which the changes in the unbalance or difference voltage are relatively small. A more detailed discussion of the above may be had by referring to Fundamentals of Engineering Electronics by W. G. Dow (1937), pages 298 through 302. It is to be understood that any non-linear device such, for example, as copper-oxide and thyrite may be used satisfactorily as a harmonic producer and, therefore, either of these may be substituted for the above thermionic harmonic producer.

Referring to Fig. 2, a signaling source 19 whose alternating voltage is to be measured applies such voltage to an amplifier 20 whose output is supplied to a modulator 21, preferably of a thermionic type, in which a predetermined harmonic of the signal voltage beats with an alternating voltage supplied by an oscillator 22 to produce preferably a predetermined modulated component having a frequency corresponding to either the sum or difference between the frequencies of the predetermined harmonic and oscillator voltages and depending on the order of modulation. The voltage of the predetermined modulator component is applied through a filter 23 to an amplifier-detector 24 in whose output is connected a suitable meter 25 for indicating the magnitude thereof. The output of the amplifier-detector 24 and the calibration of the meter 25 are arranged similarly to corresponding elements in Fig. 1.

As explained above in connection with Fig. 1, there is a certain relation between the fundamental or signaling voltage and harmonics thereof. Consequently, there is also a certain relation between the fundamental and predetermined modulated component power. Thus, in third order modulation, as the second harmonic of the fundamental or signaling voltage is utilized, the relation between the level of the fundamental power and the level of the predetermined modulated component power is exactly the same as that between the fundamental and second harmonic power mentioned above relative to Fig. 1; and in fourth order modulation, as the third harmonic of the fundamental or signaling voltage is utilized, the relation between the level of the fundamental power and the level of the predetermined modulated component power is identical with that between the levels of the fundamental and third harmonic power explained above in connection with Fig. 1. In other words, in the case of third order modulation the predetermined modulated component power is proportional to the fundamental power squared while in the case of fourth order modulation the predetermined modulated component power is proportional to the fundamental power cubed.

Thus, in the case of third order modulation a 1-decibel change in the level of the fundamental or signaling power will cause a 2-decibel change in the level of the predetermined modulated component power; and in the case of fourth order modulation a 1-decibel change in the level of the fundamental or signaling power will cause a 3-decibel change in the level of the predetermined modulated component power. In the case of higher order modulation, a 1-decibel change in the level of the fundamental or signaling power will cause a $(n-1)$ decibel change in the level of the predetermined modulated component power, where $n$ is the order of modulation.

To effect the measurement and the balancing of carrier frequency cross-talk between the pairs A and B, Fig. 3, of a cable extending between two consecutive repeater stations, energy from an oscillator 30 is applied to the far-end or sending terminal of pair A through a volume controlling potentiometer 31 while the near-end or receiving terminal of the pair A may be terminated in a network 32 in a manner that will be subsequently explained. The far-end terminal of the pair B is provided with a terminating network 33 while the near-end or receiving terminal thereof may be provided with measuring apparatus in a manner that will be hereinafter described. It is to be understood that each of the pairs A and B is terminated in apparatus having an impedance which is the characteristic impedance of either pair.

At the near-end or receiving terminal of the pair B the energy transmitted thereto as cross-talk from the pair A, when the latter is terminated in the network 32, passes through a variable attenuator 35 to a tuned amplifier 36 whose output is impressed on a modulator 37 with which is associated a variable oscillator 38. The output of the modulator 37 is applied through a filter 40 and a variable attenuator 41 to a tuned amplifier 42. One portion of the output of the tuned amplifier 42 is passed into an amplifier-detector 43 in the output of which is connected a suitable meter 44 whose operation will be subsequently described in detail. Another portion of the output of tuned amplifier 42 is passed to a modulator 45 with which is associated a fixed oscillator 46. The output of the modulator 45 is applied through transformer 47 to an amplifier 48 in whose output is connected a suitable detector 49, such as a telephone receiver.

In the operation of the system the sending oscillator is adjusted to a suitable frequency, depending on the frequency at which the cross-talk adjustment is to be made and this, of course, depends on the frequency band that is selected for the carrier frequencies. For the purpose of this illustration there will be twelve carrier channels, each of which is separated by a 4-kilocycle band, and therefore requiring a carrier band extending from 12 to 60 kilocycles. A measurement and balancing of cross-talk will be made at a frequency of 39.85 kilocycles and a check measurement made at a frequency of 28.15 kilocycles.

Assuming the sending oscillator 30 to be set for a frequency of 39.85 kilocycles and such frequency is being transmitted over the pair A, then the 39.85-kilocycle energy in the form of cross-talk passed from the pair A to the pair B is applied through the attenuator 35, which is set for zero attenuation, and transformer 34 to the tuned amplifier 36. The amplified 39.85-kilocycle cross-talk is heterodyned in the modulator 37 with 100.85-kilocycle energy supplied by the oscillator 38 to provide a frequency output of 61 kilocycles. The latter is passed through the filter 40, attenuator 41 and transformer 28 to the amplifier 42. Across the secondary winding of the transformer 28 is a variable condenser 66 for tuning the transformer 28 to a frequency of 61 kilocycles. It is to be understood that the attenuator 41 is adjusted to a position of maximum attenuation, that is, to a position of 60-decibel loss.

A portion of the amplified 61-kilocycle cross-talk energy is impressed on the amplifier-detector 43 for indication on the associated meter 44. This amplifier-detector is designed to substantially provide a logarithmic output that is the equivalent of a 12-decibel linear scale, and also includes a feature of overload limitation which is provided by plate current cut-off of the amplifier, which cut-off controls the voltage applied to the grid of the detector so that the flow of current in the output of the latter is limited accordingly. Hence, the possibility of overloading the meter 44 is obviated. In addition, the rectifier embodies a certain positive cathode bias by plate current so as to prevent rectification until the peaks of 61-kilocycle cross-talk energy exceed the value of such bias. Actually, the scale of the meter 44 reads from 7 to 100 $\overline{XTU^2}$, that is, one hundred cross-talk units squared, which units will be subsequently explained, and thus affords a visual indication of the cross-talk.

Figure 5:
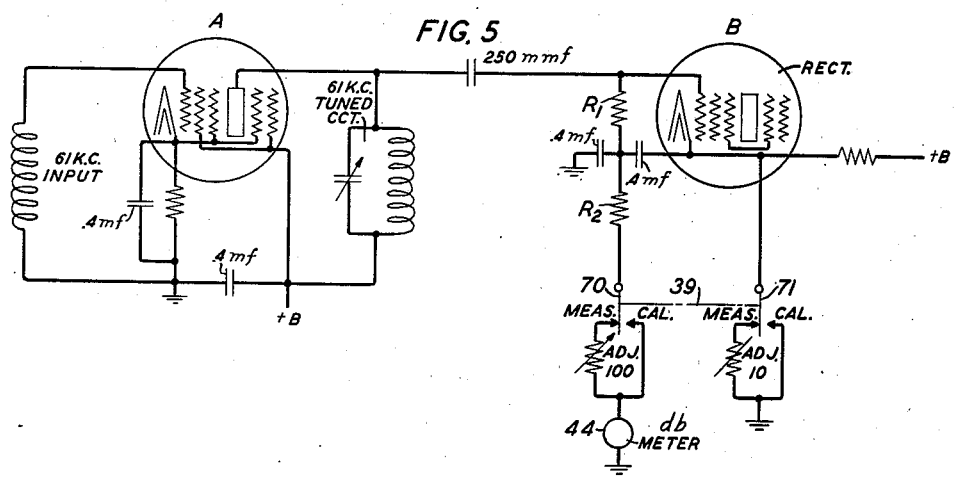
Fig. 5 is a diagrammatic circuit showing the metering apparatus of Fig. 3.

The amplifier-detector 43 shown in general in Fig. 5 is set forth in detail in an article entitled "A vacuum tube voltmeter with logarithmic response" by F. A. Hunt and appearing in the Review of Scientific Instruments, volume 4, December 1933, pages 672 through 675. Fig. 5 also embodies a calibration feature involving variable resistances ADJ.10 and ADJ.100 whose operation will be hereinafter described.

Another portion of the amplified 61-kilocycle energy is supplied over leads 50, 50 to the modulator 45 to beat with 184-kilocycle energy supplied by the oscillator 46. As this modulator is arranged for fourth order modulation, there is produced in the output thereof an audible modulated component of 1 kilocycle which is applied through the transformer 47 to the amplifier 48 in whose output is disposed a suitable detector which, in this case, is preferably a telephone receiver. The latter enables an aural observation of the cross-talk represented by the 1-kilocycle energy. It is to be understood that the transformer 47 is designed to present high impedance and low loss to the modulated component of 1 kilocycle and low impedance and high loss to all other modulated components; and also that the ratio of 1 to 3 obtains for the decibel change between the 61-kilocycle cross-talk energy impressed on the input of the modulator 45 and the 1-kilocycle cross-talk energy appearing in the output thereof, as described above in connection with Fig. 2. That is, for every 1-decibel change in the level of the power of the 61-kilocycle input there is a 3-decibel change in the level of the power of the 1-kilocycle output heard in the telephone receiver.

Fig. 4 illustrates a modification that may be substituted for the portion shown below the line X—X in Fig. 4. In this case a harmonic generator 60 is arranged to produce the third harmonic of the 61-kilocycle energy, that is 183-kilocycle energy, and this harmonic is applied through a filter 61 to an amplifier-detector 62 in whose output is a suitable meter 63, both of which may be preferably arranged in the manner described above for the amplifier-detector 43 and meter 44. The ratio of 1 to 3 obtains for the decibel change between the power of the 61-kilocycle input to the harmonic generator 60 and the power of the 183-kilocycle output thereof, as described above in connection with Fig. 1.

Thus, it is seen that the 61-kilocycle heterodyned energy in the output of the modulator 37 is a first representation of the cross-talk passing from the pair A to the pair B and the level thereof is visually observed on the meter 44, Figs. 3 and 5; and also that the audible 1-kilocycle modulated component in the output of the modulator 45 is a second representation of the cross-talk passing from the pair A to the pair B and the level thereof is aurally observed in the telephone receiver. Therefore, it is evident that the arrangement provides for simultaneous visual and aural observation of cross-talk, and further that the aural observation readily lends itself to the making of precise adjustments of the balancing unit in order to provide minimum cross-talk between the pairs A and B by taking advantage of the ratio of the decibel change between the power of the 61-kilocycle input and the power of 1-kilocycle output with respect to the modulator 45 as mentioned above.

In order to effect cross-talk balancing it is first necessary to calibrate the measuring apparatus that may be connected to the receiving end of the pair B, and this is performed as follows:

Assuming that the oscillator 39 provides the proper frequency, which in this illustration is 39.85 kilocycles, the lever of the four-pole double throw switch 65 is initially thrown to the left so as to connect the measuring apparatus to the pair A. This serves to disconnect the terminating network 32 and the pair B from the system. The attenuator 35 is conditioned so that its entire 60-decibel loss is inserted in the system, and, at the same time, the attenuator 41 is set in the CAL position, which means that its entire 60-decibel loss is also inserted in the system. A manual switch key 39 associated with rectifier B embodied in the amplifier-detector 43 serves to actuate contacts 70 and 71 to a calibrate position, as indicated by CAL in Fig. 5. This means that zero bias is applied to the grid of rectifier B and a definite load resistance $R1+R2$ is connected in the output thereof.

The variable condenser 66 associated with the transformer 28 is adjusted until maximum reading is substantially produced on the meter 44. Monitoring with the telephone receiver may be helpful in the tuning operation, as proper tuning should produce maximum volume of the 1-kilocycle tone. Next, the gain of the tuned amplifier 36 is adjusted to bring the meter reading toward 100 $\overline{XTU}^2$, and, if necessary, the gain of the tuned amplifier 42 may be adjusted to bring the meter reading precisely to 100 $\overline{XTU}^2$. In certain cases, particularly on relatively short cable sections, such gain adjustments may be inadequate to produce the required meter reading. In that event, the potentiometer 31 associated with the sending oscillator 30 is utilized to control the output of the latter until the aforesaid gain adjustments are adequate to effect the requisite meter reading. The aforementioned 100 $\overline{XTU}^2$ reading is arbitrary and could have been some other reading say, for example, 75 $\overline{XTU}^2$, depending on the magnitude of the load resistances $R1+R2$ in Fig. 5. It so happens in this illustration that due to the magnitude of the resistances R1 and R2 the reading of the meter 44 produced in the above manner would have to be at least 50 $\overline{XTU}^2$.

By definition—

1 cross-talk unit=120-decibel power ratio between adjacent disturbing and disturbed circuits embodied in an intelligence transmission system.

This means that, for such circuits having equal impedance, a 1/1000000 part of the current in a disturbing circuit is transferred to a disturbed circuit. Therefore, when the lever of the four-pole double throw switch is thrown to the left and each of the attenuators 35 and 41 is so adjusted as to insert 60-decibel loss in the system, or a total of 120-decibel loss, the measuring apparatus, due to a direct electrical connection with the pair A, is conditioned for maximum cross-talk measurement. Consequently, it would be ordinarily expected that the meter 44 would be calibrated in cross-talk units. As the initial and check measurements mentioned hereinbefore are to be accomplished on a basis of root-mean-square values of cross-talk in a manner that will be subsequently explained, it would therefore be necessary in such case to translate the readings of the meter 44 into $\overline{XTU}^2$, cross-talk units squared. This would involve an actual calculation by an operator of squaring each reading of the meter 44 obtained in a manner that will be hereinafter explained. This, of course, only tends to complicate the duties of the operator. Such calculation is obviated by calibrating the meter 44 to directly read $\overline{XTU}^2$. Accordingly, it is to be kept in mind that such calibration means merely that the meter 44 performs the calculation that would ordinarily be the task of an operator who is engaged in the balancing of cross-talk on a basis of root-mean-square values.

The insertion of 120-decibel loss in the above calibration operation corresponds to 1,000,000 XTU, cross-talk units, or, in accordance with the above-explained squared calibration of the meter 44, corresponds to 1,000,000×1,000,000 $\overline{XTU}^2$. The attenuator 35 accounts for a ratio of 1,000,000 $\overline{XTU}^2$ and is arranged to insert and remove the entire 60-decibel loss at a given instant while the attenuator 41 accounts for the other ratio of 1,000,000 $\overline{XTU}^2$ and is arranged to insert and remove the 60-decibel loss in equal steps of 10 decibels. Associated with each degree of attenuation provided by the attenuator 41 is a multiplying factor which when multiplied by the reading of the meter 44 at that instant gives the total $\overline{XTU}^2$ for that attenuation plus a certain adjustment of the balancing unit, as will be subsequently described.

The following shows the relation between the various degrees of attenuation and the multiplying factors:

| Decibel loss attenuator 41 | Multiplying factor |
|---|---|
| 60 | CAL($10^5$) |
| 50 | $10^4$ |
| 40 | $10^3$ |
| 30 | $10^2$ |
| 20 | 10 |
| 10 | 1 |
| 0 | 0.1 |

From the above, it is observed that a factor 10 is associated with the various degrees of attenuation and the multiplying factors. In other words, for each 10-decibel variation in attenuation there is a variation of 10 in the multiplying factor. Such factor is necessary in order to maintain a relation between the calculated $\overline{XTU}^2$ and the various degrees of attenuation provided by the attenuator 41 in a manner that will be hereinafter explained.

Having provided a reading of 100 $\overline{XTU}^2$ in the manner aforeexplained with the contacts 70 and 71 in the CAL position, the calibration operation is continued by actuating the switch key to move both contacts 70 and 71 to a measure position, as indicated by MEAS. in Fig. 5. ADJ.10 resistance is adjusted to so bias the detector B as to provide a 10 $\overline{XTU}^2$ reading on the meter 44.

Thus, the product of 10 $\overline{XTU^2} \times 10^5$ (multiplying factor of attenuator 41) totals 1,000,000 $\overline{XTU^2}$ which corresponds to the 60-decibel loss provided by the attenuator 41. Next, the attenuator 41 is moved from the CAL position (60-decibel loss) to the next lowest position $10^4$ (50-decibel loss) and the ADJ.100 resistance is adjusted to so augment the load, $R1+R2$, as to provide a reading of 100 $\overline{XTU^2}$ on the meter 44. Thus, the product of 100 $\overline{XTU^2} \times 10^4$ (multiplying factor of attenuator 41) totals 1,000,000 $\overline{XTU^2}$ which also corresponds to the 60-decibel loss provided by the attenuator 41. As the product of each of the CAL ($10^5$) and $10^4$ multiplying factors and the respective meter readings on the meter 44 totals 1,000,000 $\overline{XTU^2}$, which is the equivalent of a 60-decibel loss, the apparatus is now properly calibrated. The ADJ.10 and ADJ.100 resistances are outstandingly important in that a use thereof tends to promote accuracy by making possible field adjustments of the biasing and load resistances, respectively, so as to compensate for aging and/or replacements of elements, such as thermionic tubes, condensers and resistors.

As Fig. 5 shows in general the amplifier-detector arrangement described in the article in the Review of Scientific Instruments, supra, the only portion requiring detailed explanation herein is the resistances ADJ.10 and ADJ.100 both of which are discussed above in connection with the calibration operation.

In effecting balancing or minimizing of cross-talk between the two pairs under test, it may be assumed, for the purpose of illustration, that the two adjusting panels including the necessary balancing units mentioned hereinbefore are associated with the conductor pairs at the receiving or near end of the cable section under test. The adjusting panels and balancing units are not shown in Fig. 3 and therefore it may be assumed that they are generally similar to the corresponding units in the patent of Chapman and Coolidge, supra. In order to minimize changes in the interaction of one balancing unit on another and to facilitate adjustments thereof, the cores on all balancing units are initially set at approximately mid-position, or a position of substantially zero coupling.

Having calibrated the cross-talk measuring apparatus in the manner aforeexplained, the lever of the four-pole double throw switch 65 is thrown to the right so as to connect the terminating network 32 to the pair A and the hereinbefore-described measuring apparatus to the pair B. The attenuator 35 is next adjusted to the position of zero loss so that cross-talk transferred from the pair A to the pair B and flowing in the latter is directly applied to the transformer 34. At the same time, it is to be remembered that the attenuator 41 is now in the $10^4$ multiplying factor position (50-decibel loss). Thus, with the balancing unit and measuring apparatus conditioned as aforedescribed in the calibration operation, the meter 44 may or may not provide a reading depending on the value of the cross-talk present in the pair B. For a relatively large ratio of cross-talk, the meter 44 will provide a reading somewhere on the scale thereof, while for a relatively small ratio of cross-talk it may be necessary to reduce the loss in attenuator 41 in order to provide a reading on the meter 44.

Assuming the meter 44 provides a reading of 85 $\overline{XTU^2}$, the balancing unit associated with the pairs A and B is adjusted so as to bring the reading to a value preferably below 10 $\overline{XTU^2}$. The attenuator 41 is then moved to the next lowest multiplying factor $10^3$ (40-decibel loss) and the balancing unit is further adjusted in the same direction as before to bring the meter reading again preferably below 10 $\overline{XTU^2}$. The attenuator 41 is moved to the next lowest multiplying factor $10^2$ (30-decibel loss) and the balancing unit further adjusted in the same direction as before to bring the meter reading again preferably below 10 $\overline{XTU^2}$. The attenuator 41 is successively moved to the next lowest multiplying factor comprising in descending order 10, 1 and 0.1 (20, 10 and 0 decibel losses, respectively) and the balancing unit is adjusted for each thereof in the same direction as before to preferably provide a meter reading below 10 $\overline{XTU^2}$. Thus, the process is continued until the product of the multiplying factor and the meter reading therefor attains a minimum value which serves to indicate the optimum balancing unit adjustment that produces minimum cross-talk between the pairs. In the above it is to be understood that while it is preferable for each particular multiplying factor and adjustment of the balancing coils to bring the meter reading below 10 $\overline{XTU^2}$, there may be cases where such is impossible and in such cases it will be satisfactory to bring the meter reading as close as possible to 10 $\overline{XTU^2}$.

The above operations including the tabulations may be readily understood from the following table:

| Attenuator 41 multiplying factor | Decibel loss | $\overline{XTU^2}$ meter reading | Total calculated $\overline{XTU^2}$ |
|---|---|---|---|
| 10 | 20 | 90 | 900 |
| 1 | 10 | 20 | 20 |
| 0.1 | 0 | 90 | 9 |

Thus, it is seen that the product of the multiplying factor 0.1 and meter reading 90 totals 9 $\overline{XTU^2}$ and as this is the lowest total calculated $\overline{XTU^2}$, the balancing unit is set in the adjustment that provides this calculation. Also, this product is recorded as the cross-talk measurement between pairs A and B.

In accomplishing the balancing unit adjustment for each of the several multiplying factors, it is to be noted that the telephone receiver may be of considerable aid not only in the respect that the aforedescribed ratio of the decibel change between the level of the input of the modulator 45 and the level of the 1-kilocycle tone output thereof tends to simplify obtaining an optimum adjustment of the balancing unit but also in the respect that such change ratio enables the attainment of the optimum adjustment in a minimum time. This is outstandingly important when it is considered that a carrier cable ordinarily contains a relatively large number of carrier pairs to be balanced. Fig. 6 shows the theoretical and measured relation between the level of the power of the 61-kilocycle heterodyned input applied to the modulator 45 and the level of the power of the 1-kilocycle output thereof. Referring to the theoretical curve, it is seen that for each 1-decibel change in the 61-kilocycle input applied to the modulator 45 there should be a 3-decibel change in the 1-kilocycle output thereof. The measured curve obtained with the apparatus shown and described in connection with Fig. 3 indicates clearly that the ratio of 1 to 3 follows substantially the theoretical ratio of the 1 to 3 change mentioned above. In other words, the measured curve shows, during each adjustment of the balancing unit, that for each 1-decibel decrease in the 61-kilocycle input to the modulator 45 there is substantially a 3-decibel decrease in the 1-kilocycle output thereof.

Similarly, the lowest $\overline{XTU}^2$ calculation and optimum adjustment of the balancing unit are determined for pairs A and C and thereafter all other pairs coupled with the pair A. Then, the procedure is repeated using in turn pairs B, C, etc., as the disturbing circuit and adjusting all balancing units coupling each thereof with the other pairs until all pair combinations in the cable are balanced.

After completing the calculations for a test frequency of 39.85 kilocycles, the oscillator 30 is adjusted to a frequency of 28.15 kilocycles and check calculations made thereat in the manner set forth above.

To compare the results of the balancing at frequencies of 28.15 and 39.85 kilocycles, the following equation is useful: root-mean-square cross-talk coupling in cross-talk units=

$$\sqrt{\frac{\text{sum of (cross-talk units)}^2}{N(\text{number of readings})}}$$

The root-mean-square values of cross-talk at the frequencies of 28.15 kilocycles and 39.85 kilocycles should differ by less than 5 root-mean-square cross-talk units, if adjustments of the balancing unit were properly and accurately performed.

It is to be understood that when the lever of the four-pole double throw switch is thrown to the left and both attenuators 35 and 41 are adjusted to zero loss positions, then the apparatus will measure the transmission level of the waves transmitted from the sending end of the pair A and received at the receiving end thereof. In such case the heterodyned output of the amplifier 42 is modulated to second or higher order modulation and a predetermined modulated component observed on a suitable detector, which may be either the amplifier-detector 43 and meter 44 shown in Figs. 3 and 5, or a telephone receiver. Obviously, the modulated component must be audible so as to be useful with the telephone receiver although such component may also be inaudible for measurement in the amplifier-detector 43 and meter 44. As an alternative the amplified heterodyned output of amplifier 42 may be applied to a harmonic generator, Fig. 4, and a predetermined harmonic thereof produced in the generator 60. This harmonic may then be measured on the amplifier-detector 62 and meter 63. The outstanding advantage of either of these arrangements is that precise measurements may be obtained, due to the ratio of the change between the power levels of the input and output of the modulator 45 in Fig. 3 and the input and output of the harmonic generator 60 in Fig. 3 as aforedescribed in connection with the respective Figs. 2 and 1.

It is to be understood that while the invention is disclosed in connection with two conductor pairs extending together for a certain distance, it is also equally applicable to conductor pairs not necessarily extending together but otherwise coupled, as, for example, by a third conductor pair or other neighboring apparatus; and further that while certain of the measurements mentioned in connection with the various figures are made on a basis of alternating voltages such measurements may also be made on a basis of direct current, utilizing for this purpose one of several well-known devices.

What is claimed is:

1. The method of observing cross-talk between two conductor pairs extending together for a certain distance which comprises applying alternating current waves to one pair, deriving from cross-talk in the other pair a certain harmonic component, and observing cross-talk represented by said certain harmonic component.

2. The method of observing cross-talk between two conductor pairs extending together for a certain distance which comprises applying alternating current waves to one pair, deriving from cross-talk in the other pair a certain modulated component of a certain order of modulation, and observing cross-talk represented by said certain modulated component.

3. The method of observing cross-talk between two conductor pairs extending together for a certain distance which comprises applying alternating current waves to one pair, deriving from cross-talk in the other pair a certain first component, deriving from said certain first component a certain second component, and observing cross-talk represented by said certain second component.

4. The method of observing cross-talk between two conductor pairs extending together for a certain distance which comprises applying alternating current waves to one pair, deriving from cross-talk in the other pair a certain first modulated component, deriving from said certain first modulated component a certain second modulated component, and observing cross-talk represented by said certain second modulated component.

5. The method of observing cross-talk between two conductor pairs extending together for a certain distance which comprises applying alternating current waves to one pair, deriving from cross-talk in the other pair a certain modulated component, deriving from said certain modulated component a certain harmonic component, and observing cross-talk represented by said certain harmonic component.

6. The method of observing cross-talk between two conductor pairs extending together for a certain distance which comprises applying alternating current waves to one pair, deriving from cross-talk in the other pair a certain first component, attenuating said certain first component in predetermined amounts, deriving from said attenuated certain first component a certain second component, and observing cross-talk represented by said certain second component for each amount of attenuation of said certain first component.

7. The method of observing cross-talk between two conductor pairs extending together for a certain distance which comprises applying alternating current waves to one pair, deriving from cross-talk in the other pair a certain modulated component, attenuating said certain modulated component in predetermined amounts, deriving from said attenuated certain modulated component a certain harmonic component, and observing cross-talk represented by said certain harmonic component for each amount of attenuation of said certain modulated component.

8. The method of observing cross-talk between two conductor pairs extending together for a certain distance which comprises applying alternating current waves to one pair, deriving from cross-talk in the other pair a certain first modulated component, attenuating said certain first modulated component in predetermined amounts, deriving from said attenuated certain first modulated component a certain second modulated component, and observing cross-talk represented by said certain second modulated component for each amount of attenuation of said certain first modulated component.

9. In combination with two conductor pairs extending together for a certain distance, means to apply alternating current waves to one pair, means connected to the other pair to derive from cross-talk therein a certain modulated component such that the ratio of the change of the level of the energy of said cross-talk to the level of the energy of said modulated component is greater than the order of 1 to 2, and means to observe cross-talk represented by said certain modulated component.

10. In combination with two conductor pairs extending together for a certain distance, means to apply alternating current waves to one pair, means connected to the other pair to derive from the cross-talk therein a certain first modulated component, means to derive from said certain first modulated component a certain second modulated component such that the ratio of the change of the level of the energy of said certain first modulated component to the level of the energy of said certain second modulated component is of the order of 1 to $(n-1)$, where $n$ is the order of modulation of said certain second modulated component, and means to observe cross-talk represented by said certain second modulated component.

11. In combination with two conductor pairs extending together for a certain distance, means to apply alternating current waves to one pair, means connected to the other pair to derive from the cross-talk therein a modulated component such that the ratio of the change of the level of the energy of cross-talk to the level of the energy of said modulated component is of the order of 1 to $(n-1)$, where $n$ is the order of modulation of said modulated component, and means to observe cross-talk represented by said modulated component.

12. In combination with two conductor pairs extending together for a certain distance, means to apply alternating current waves to one pair, means connected to the other pair to derive from the cross-talk therein a component such that the ratio of the change of the level of the energy of said cross-talk to the level of the energy of said component is at least of the order of 1 to 2, and means to observe cross-talk represented by said component.

13. In combination with two conductor pairs extending together for a certain distance, means to apply alternating current waves to one pair, means connected to the other pair to derive from cross-talk therein a certain component such that the ratio of the change of the level of the energy of said cross-talk to the level of the energy of said certain component is at least of the order of 1 to 2, means to attenuate said cross-talk and thereby said certain component in predetermined amounts, and means to observe cross-talk represented by said certain component for each amount of attenuation of said cross-talk.

14. In combination with two conductor pairs extending together for a certain distance, means to apply alternating current waves to one end of one pair, means connected to the opposite end of the other pair to derive from cross-talk therein a certain first modulated component, means to derive from said certain first modulated component a certain second modulated component such that the ratio of the change of the level of the energy of said certain first modulated component to the level of the energy of said certain second modulated component is greater than the order of 1 to 2, means to attenuate said certain first modulated component and thereby said certain second modulated component including a multiplying factor to identify each amount of attenuation, means to observe visually cross-talk represented by said certain first modulated component and corresponding to the different amounts of attenuation, the product of each of said visual representations and each of said multiplying factors representing cross-talk for each amount of attenuation and the minimum numerical value of such products representing the minimum level of cross-talk, and means to observe aurally in a manner simultaneous with said visual observations cross-talk represented by said attenuated certain second modulated component for each amount of attenuation of said certain first modulated component.

15. In the combination according to claim 14 in which the ratio of the change of the level of the energy of said certain first modulated component to the level of the energy of said certain second modulated component is of the order of 1 to $(n-1)$ where $n$ is the order of modulation of said certain second modulated component.

16. In combination with two conductor pairs extending along together for a certain distance, means to apply alternating current waves to one pair, means to derive from cross-talk in the other pair a certain harmonic component, and means to observe cross-talk represented by said certain harmonic component.

17. In combination with two conductor pairs extending along together for a certain distance, means to apply alternating current waves to one pair, means to derive from cross-talk in the other pair a certain harmonic component such that the ratio of the change of the level of the energy of cross-talk to the level of the energy of said certain harmonic component is of the order of 1 to $n$, where $n$ is the order of the harmonic component of cross-talk, and means to observe cross-talk represented by said certain harmonic component.

18. In combination with two conductor pairs extending together for a certain distance, means to apply alternating current waves to one pair, means connected to the other pair to derive from cross-talk therein a certain harmonic component such that the ratio of the change of the level of the energy of said cross-talk to the level of the energy of said certain harmonic component is at least of the order of 1 to 2, means to attenuate said cross-talk and thereby said certain harmonic component in predetermined amounts, and means to observe cross-talk represented by said attenuated certain harmonic component for each amount of attenuation of said cross-talk.

19. In combination with two conductor pairs extending together for a certain distance, means to apply alternating current waves to one end of one pair, means connected to the opposite end of the other pair to derive from cross-talk therein a certain modulated component, means to derive from said certain modulated component a certain harmonic component such that the ratio of the change of the level of the energy of said certain modulated component to the level of the energy of said certain harmonic component is of the order of 1 to $n$, where $n$ is the harmonic order of said certain harmonic component, means to attenuate said certain modulated component and thereby said certain harmonic component including a multiplying factor to identify each amount of attenuation, means to observe visually cross-talk represented by said certain modulated component and corresponding to the different amounts of attenuation, the product of each of said visual representations and each of said multiplying factors representing cross-talk for each amount of attenuation and the minimum numerical value of such products representing the minimum level of cross-talk, and means to observe aurally in a manner simultaneous with said visual observations cross-talk represented by said attenuated certain harmonic component for each amount of attenuation of said certain modulated component.

20. In the combination according to claim 19 in which the ratio of the change of the level of the energy of said certain modulated component to the level of the energy of said certain harmonic component is at least of the order of 1 to 2.

EDWIN P. FELCH, Jr.